Patented Sept. 5, 1950

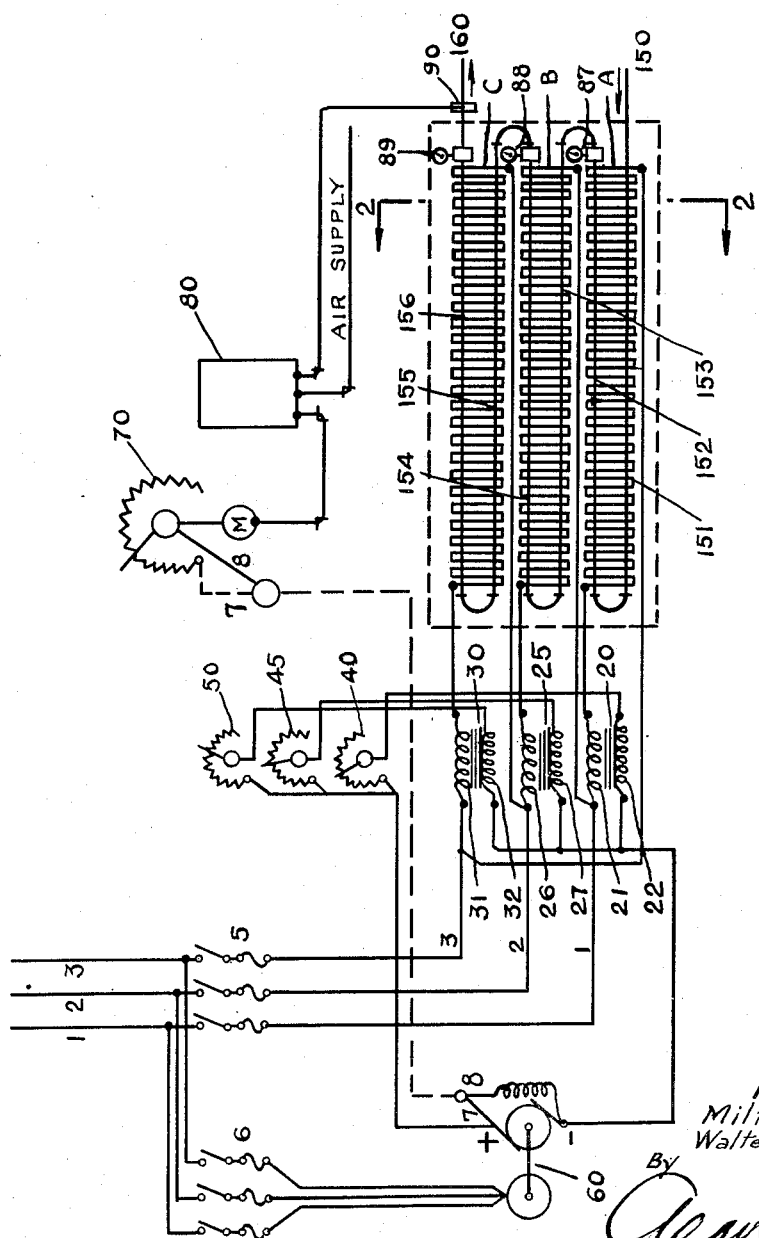

2,521,207

UNITED STATES PATENT OFFICE 2,521,207

GASEOUS REACTION FURNACE AND CONTROLLER

Milton Eaton and Walter E. Barker, Shawinigan Falls, Quebec, Canada, assignors to Shawinigan Chemicals Limited, of Montreal, Quebec, Canada Application November 30, 1945, Serial No. 632,047
In Canada October 23, 1945

3 Claims. (Cl. 23—277)

Introduction

This invention relates to vapour phase reactions, particularly of the nature of those employed in the manufacture of ketenes, and more specifically to a process and apparatus for carrying out such reactions.

Ketene can be produced by the thermal decomposition of acetic acid in the presence of a catalyst. Since ketene is an extremely active compound and will decompose readily at elevated temperatures, it is necessary to control the temperature of formation closely and it is desirable that the temperature in the heating furnace be regulated so that there will be two or more zones operating at different temperatures (see U. S. 1,946,707 Ex. 2; U. S. 1,975,663 page 2, lines 11–22). This has been accomplished, for example, by using a preheater and a pyrolysis chamber in series, heated by a burner as described in U. S. 2,232,705. In the method of that disclosure, it is, however, impossible to vary independently the heat input to the preheater and pyrolysis chamber respectively.

The present invention contemplates, in methods of the nature described, where heating is accomplished in several stages, the automatic maintenance of a substantially constant predetermined differential of temperature between the stages and an overall control of the temperature in response to a selected condition, for instance in response to the temperature of the gas leaving the final stage.

Where this method is carried out in an apparatus, having a single chamber, we have found that the heat input to the various zones of the chamber may be conveniently regulated and controlled by an arrangement including saturable core reactors, grid-type electrical resistance heating elements, and control devices which may be better understood from the following detailed description of a preferred embodiment of the invention.

Detailed description

The invention will now be described in more detail by reference to the accompanying drawings, in which:

Figure 1 is a diagrammatic longitudinal vertical cross-section of a furnace suitable for carrying out endothermic chemical reactions in the gaseous phase according to the present invention.

Figure 2 is a transverse vertical cross-section taken along the line 2—2 of Figure 1.

Referring more particularly to the drawings, parallel connected groups of grid-type electric heating elements A, B, and C are mounted opposite each other on the walls of furnace 10. Series-connected pipes 151 to 156 conduct gas through the furnace and are arranged in pairs between the three groups of heating elements as shown in Figure 2. The pipes are heated by direct radiation from the heating elements with which they are in close proximity. By varying the power input to elements A, B, and C, the temperature of the gas in their associated pipes may be regulated accordingly. With the arrangement as shown, the series connected pipes are divided into three sections or zones in which the temperature may be regulated independently. The temperature of the gas as it leaves the various sections is measured by instruments 87, 88, and 89 which have their sensitive elements inserted in the pipes.

The three groups of electric heating elements A, B, and C are each connected in series with saturable core reactors 20, 25, and 30, respectively. They are then delta connected through fused switch 5 with phases 1, 2, and 3 of the 3-phase power supply. This is the usual method of connecting a substantial load with a 3-phase power supply, but if desired, the groups of heating elements could be connected with a single phase. Also, there is no limit to the number of groups and corresponding furnace sections or zones in which the temperature can be independently regulated.

The current taken by any group of heating elements A, B, or C, and hence the temperature of the gas passing through the corresponding furnace section, is determined by the reactance of its series-connected saturable reactor 20, 25, or 30. These reactors have alternating current windings 21, 26, and 31 connected in series with heating elements A, B, and C respectively, and auxiliary windings 22, 27, and 32 connected with a source of direct current through rheostats 40, 45, and 50. The direct current produces a saturating flux which changes the permeability of the reactor core, and hence the reactance, in proportion to the strength of the current, which is controlled by the series-connected rheostat.

The proportion of current taken by each group of heating elements, A, B, and C is determined by the adjustment of rheostats 40, 45, and 50 respectively. The total power input to the three phases is determined by the direct current voltage supplied by motor-generator set 60 which is controlled by the adjustment of its field rheostat 70. If the resistance of 70 is decreased, the generator voltage rises and the saturating flux of the reactors increases, causing a decrease in reactance and corresponding increase in power input to the heating elements; conversely increasing the resistance of 70 decreases the total power input of the furnace.

Manual adjustment of rheostats 40, 45, and 50 determines the proportion of power input to, and hence the relative temperatures of the furnace zones. The total power input and resulting gas temperatures depend on the direct current voltage which is controlled automatically in response to the outgoing gas temperature by controller 80, which has its sensitive element 90 located in pipe 156 and final control element M connected with rheostat 70. Controller 80 functions to maintain the outgoing gas at a constant adjustable temperature by automatic adjustments of rheostat 70 which in turn varies the power input as described above.

A number of temperature controllers are available that would be suitable for this application, one of which is a Minneapolis-Honeywell, type L097A, temperature controller described on page 42 of the manufacturer's Catalogue No. 7, June 1941. This controller would have an associated damper motor, described on page 43 of this catalogue and shown schematically as M Fig. 1, to position rheostat 70. This is an air-operated controller which requires a source of compressed air as indicated in the drawing.

A motor-generator set 60, with its motor connected to the power supply by means of switch 6, is shown as a suitable source of direct current. The D. C. voltage is regulated by means of the generator field rheostat 70. Similar performance could be obtained with a constant potential source of direct current if a suitable rheostat R were connected between the source of supply and the common connection to rheostats 40, 45, and 50. With this arrangement the adjustment of rheostat R would determine the voltage drop across it and hence the voltage applied to the reactors through their series connected rheostats.

*Operation*

The equipment is put into operation on manual control. After closing switches 5 and 6, thus starting the motor-generator set and energizing the furnace heaters, the generator voltage is adjusted by means of rheostat 70. The gas to be cracked is fed into the inlet end 150 of the furnace cracker pipe with the required conditions of pressure, catalyst concentration, rate of flow, etc. Rheostats 40, 45, 50, and 70 are adjusted to obtain the optimum temperatures at various points as indicated by instruments 87, 88, and 89. Controller 80 is then set to maintain the desired outlet gas temperature and automatic control is established by putting rheostat 70 under control of controller 80.

It will be understood that, without departing from the spirit of the invention or the scope of the claims, various modifications may be made in the specific expedients described. The latter are illustrative only and not offered in a restricting sense, it being desired that only such limitations shall be placed thereon as may be required by the state of the prior art.

The sub-titles used throughout the specification are merely to simplify reference thereto and should otherwise be disregarded.

We claim:
1. An apparatus for carrying out reactions in the gas phase comprising (a) sources of alternating and direct current power, (b) a furnace, (c) a plurality of electric heaters in said furnace energized by said alternating-current power, (d) a plurality of saturable-core reactors, each with a rheostat for individually adjusting its reactance by control of the saturating current, each heater being in series with a corresponding reactor, (e) a main rheostat for adjusting simultaneously and by an equal proportion the reactance of each of the reactors by control of the net voltage supplying the saturating current for the reactors, (f) series-connected gas-conducting pipes respectively adjacent to said heaters within the furnace, and (g) temperature-responsive means in the said pipes for controlling the adjustment of the main rheostat.

2. An apparatus for regulating an electric furnace for carrying out gaseous reactions wherein the gas is passed in series-connected pipes through a plurality of zones with an electric heater, energized by alternating-current power, in each, comprising the combination of (a) a variable reactance connected in series with each heater, (b) first control means for individually adjusting said variable reactances manually, and (c) second control means, co-acting with said first control means, for overriding said first control means to vary simultaneously and equally the adjustment of all of said reactances in response to the controlling means of an automatic temperature controller the measuring means of which measures the temperature of the gas at a selected point in said series-connected pipes.

3. An apparatus for regulating an electric furnace for carrying out gaseous reactions wherein the gas is passed in series-connected pipes through a plurality of zones with an electric heater in each, energized by alternating-current power comprising the combination of (a) a plurality of saturable-core reactors, each connected in series with one of said heaters, (b) a direct-current generator, (c) a plurality of rheostats, each connected in series with the direct-current winding of one of said reactors, and with said direct-current generator, (d) an additional rheostat controlling the net voltage of said direct-current generator, and (e) an automatic temperature controller having its controlling means operably connected with said voltage-control rheostat and its measuring means located at a selected point in said series-connected pipes.

MILTON EATON.
WALTER E. BARKER.

REFERENCES CITED

The following references are of record in the file of this patent:

UNITED STATES PATENTS

| Number | Name | Date |
|---|---|---|
| 1,313,314 | Metzger | Aug. 19, 1919 |
| 1,940,355 | Knapp | Dec. 19, 1933 |
| 1,946,707 | Meingast | Feb. 13, 1934 |
| 1,975,663 | Reid | Oct. 2, 1934 |
| 2,024,783 | Smith | Dec. 17, 1935 |
| 2,276,822 | Bowman | Mar. 17, 1942 |
| 2,294,775 | Edwards | Sept. 1, 1942 |
| 2,311,118 | Matthews | Feb. 16, 1943 |
| 2,367,619 | Schneider | Jan. 16, 1945 |
| 2,398,673 | Schneider | Apr. 16, 1946 |